United States Patent [19]
Ausnit

[11] Patent Number: 6,131,370
[45] Date of Patent: Oct. 17, 2000

[54] ZIPPER APPLIED ACROSS A FILM IN TRANSVERSE DIRECTION

[75] Inventor: Steven Ausnit, New York, N.Y.

[73] Assignee: Illinois Tool Works Inc., Glenview, Ill.

[21] Appl. No.: 09/501,156

[22] Filed: Feb. 9, 2000

[51] Int. Cl.[7] .................................................. B65B 61/18
[52] U.S. Cl. .......................... 53/412; 53/133.4; 53/139.2; 53/451; 53/551; 493/213; 493/214; 493/927
[58] Field of Search ..................................... 493/212, 213, 493/214, 215, 927; 53/412, 451, 551, 133.4, 139.2

[56] References Cited

U.S. PATENT DOCUMENTS

| | | |
|---|---|---|
| 4,666,536 | 5/1987 | Van Erden et al. . |
| 5,111,643 | 5/1992 | Hobock . |
| 5,412,924 | 5/1995 | Ausnit . |
| 5,557,907 | 9/1996 | Malin et al. . |
| 5,564,259 | 10/1996 | Stolmeier . |

FOREIGN PATENT DOCUMENTS 0 528 721 A2  2/1993  European Pat. Off. .

*Primary Examiner*—Daniel B. Moon
*Attorney, Agent, or Firm*—Pitney, Hardin, Kipp & Szuch LLP

[57] ABSTRACT

The apparatus and method attaches a section of unsupported interlocking zipper transversely to portion of film drawn around a fill tube of a form fill and sea machine. This includes the steps of driving and guiding said zipper horizontally around the outside of the film formed around the tube in a direction transverse to direction of movement of the film, after the formation of the fin seal. An alternative embodiment drives and guides the zipper horizontally around the inside of the film formed around the tube prior to the formation of the fin seal. A retractable ledge may be used to guide the zipper in the alternative embodiment. A slider operated zipper can also be used in this alternative.

25 Claims, 7 Drawing Sheets

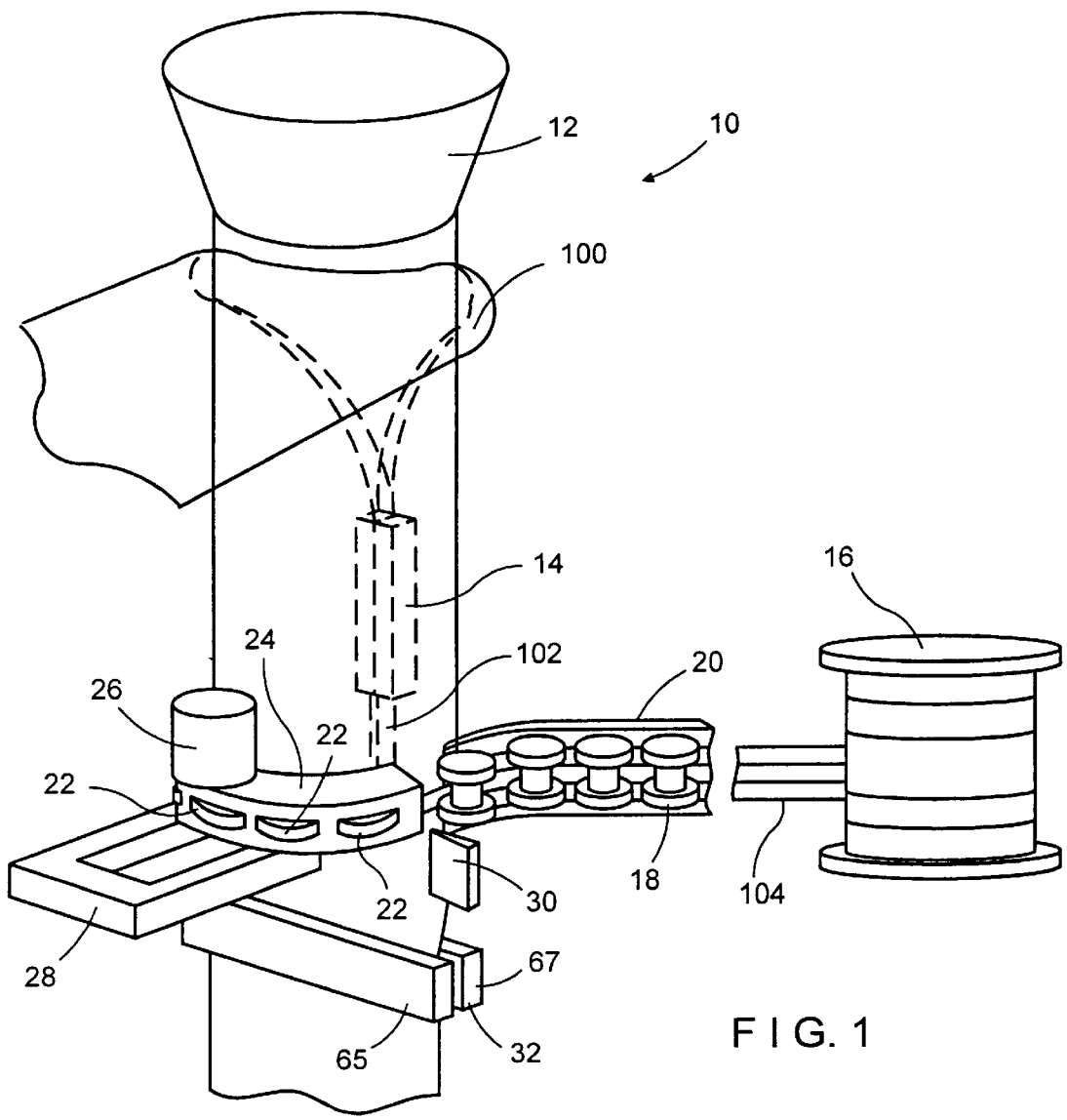
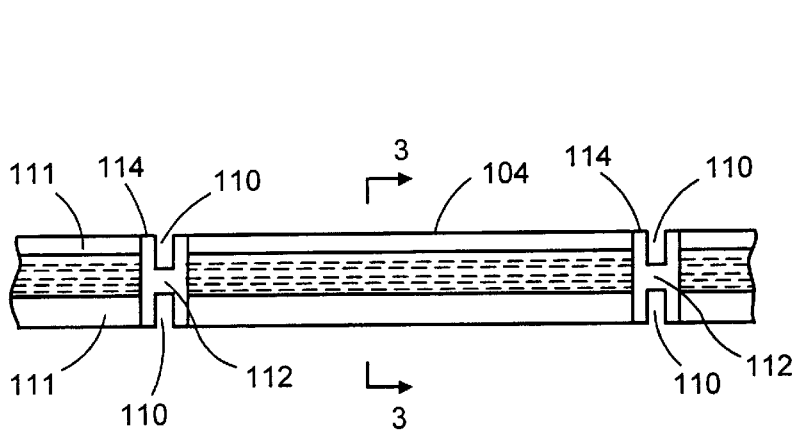
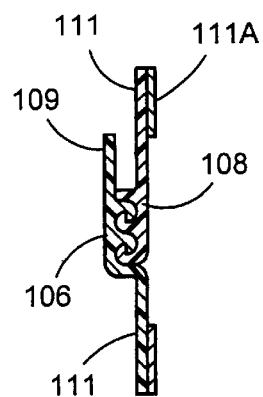
FIG. 1
FIG. 2
FIG. 3

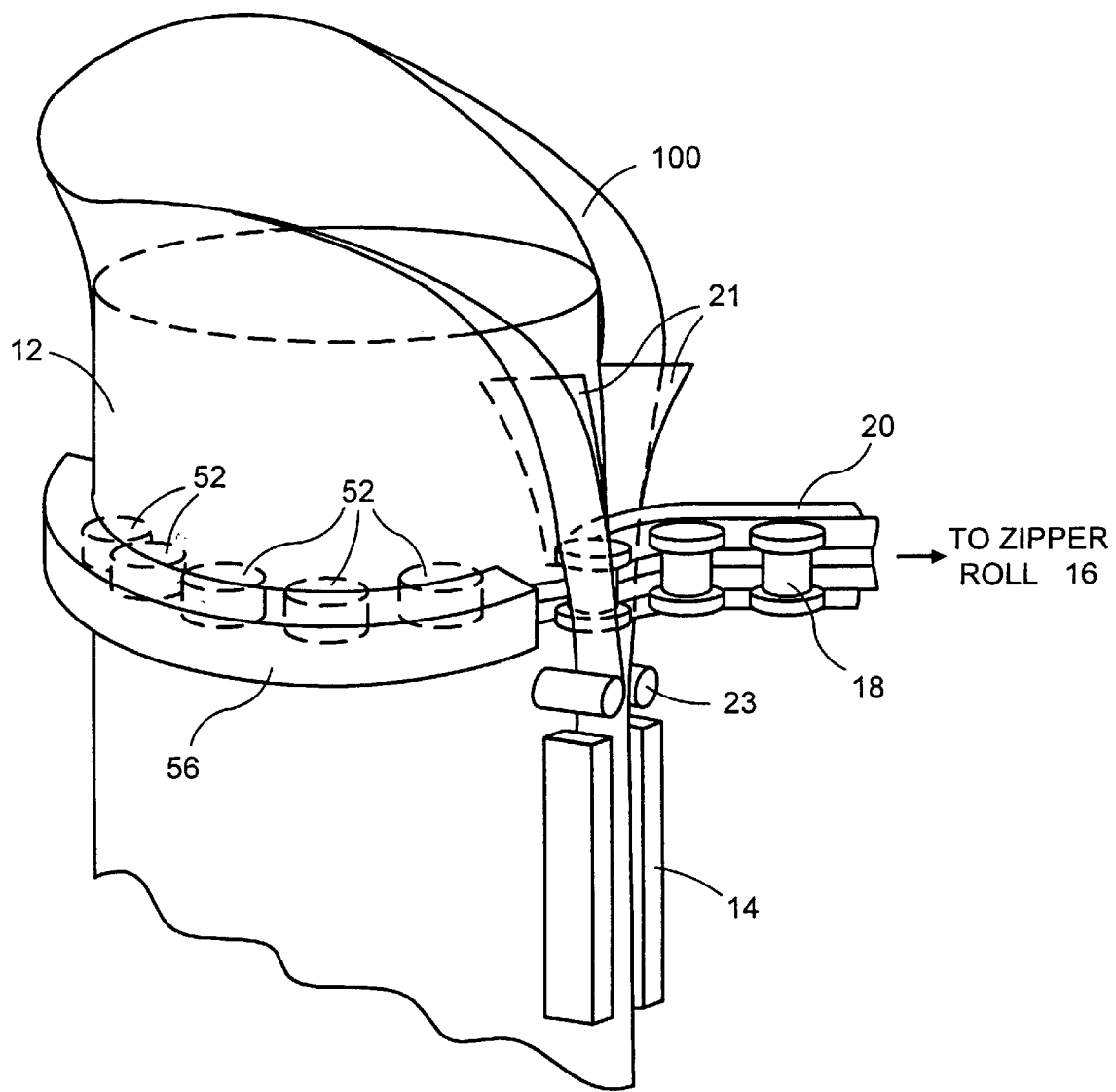
F I G. 6

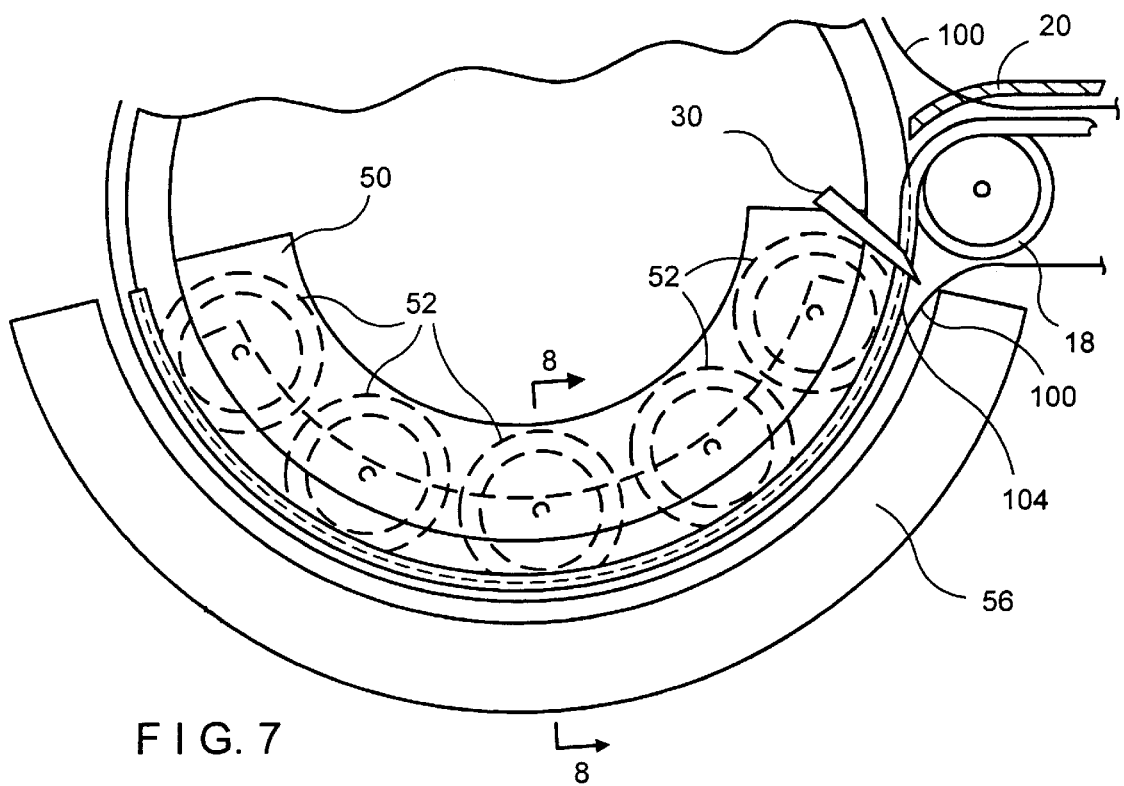
FIG. 7
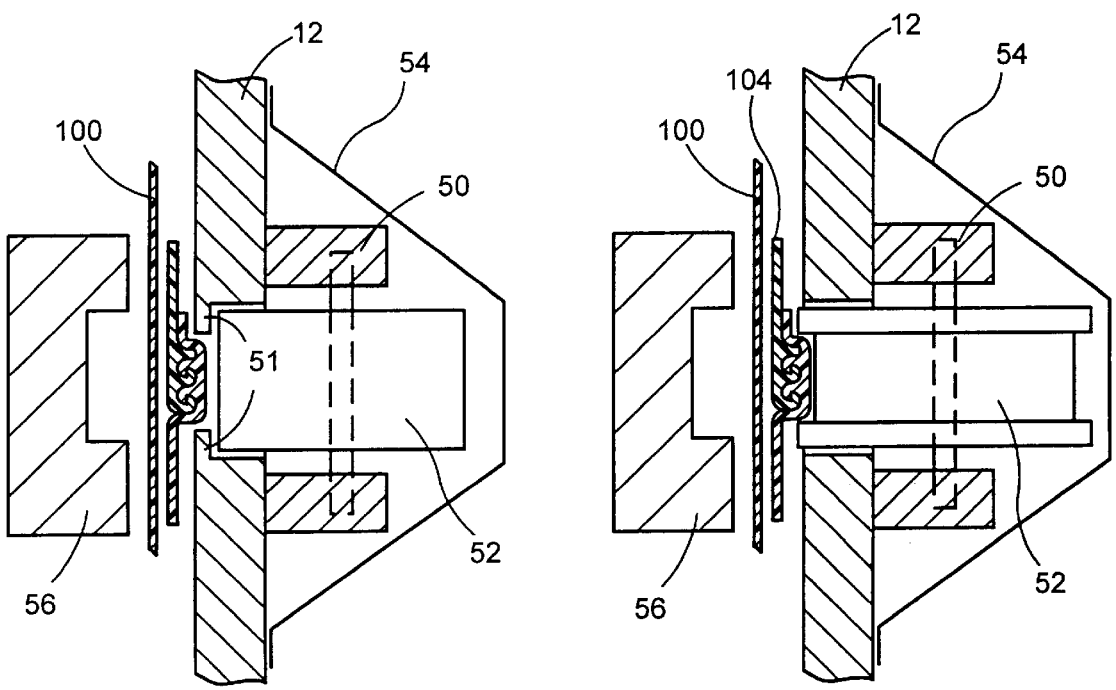
FIG. 8
FIG. 8A

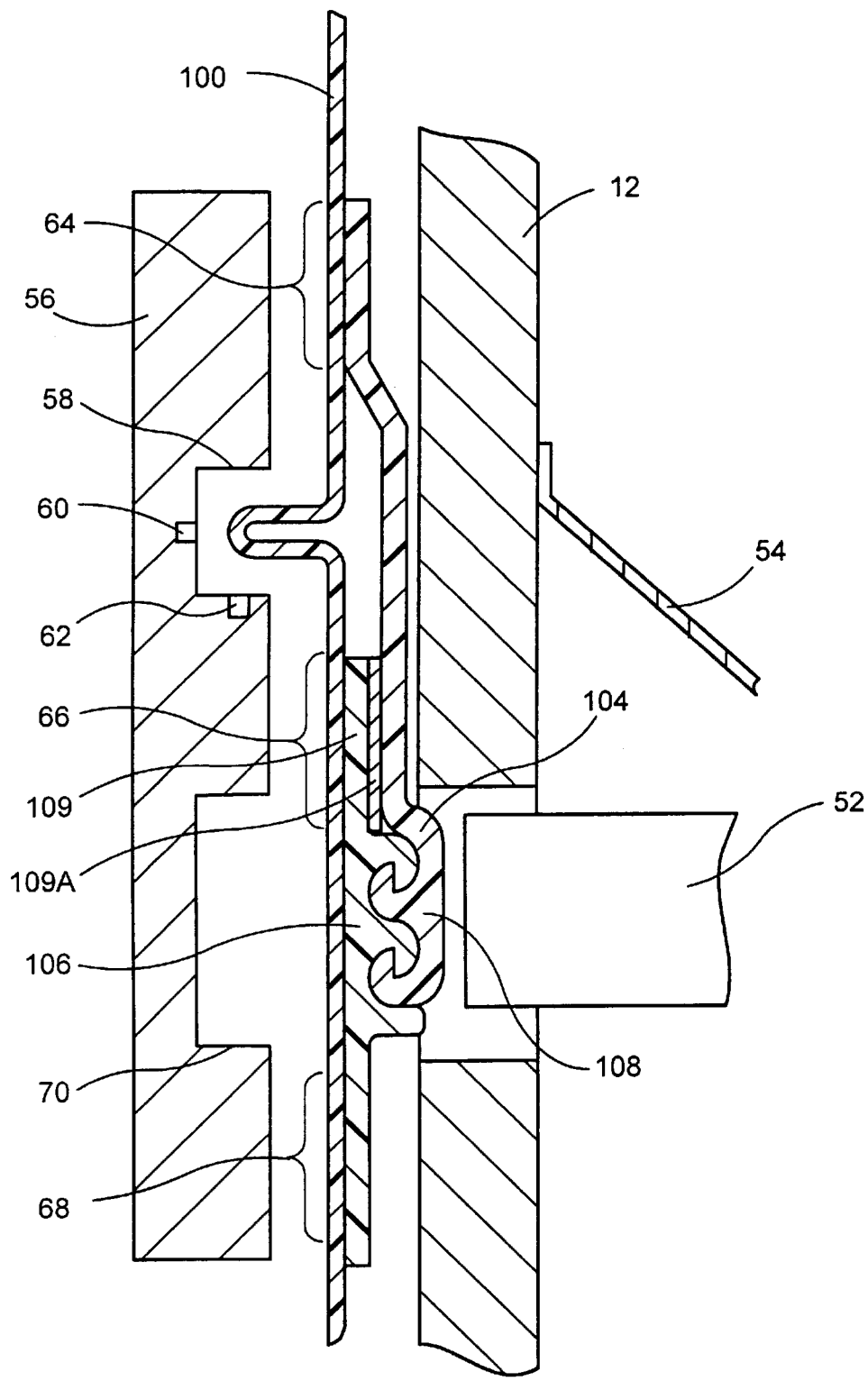
F I G. 9

ZIPPER APPLIED ACROSS A FILM IN TRANSVERSE DIRECTION

BACKGROUND OF THE INVENTION

1. Field of the Invention

This invention pertains to a method and apparatus for attaching an unsupported zipper to aid across a film in a vertical form fill and seal (VFFS) apparatus. More particularly, the zipper is attached to the outside of the film in the filling tube area, after the fin seal has been made and in front of the cross seal, with the filling tube acting as a backup for the sealing bar. In an alternative embodiment, the unsupported zipper is attached to the inside of the film in the filling tube area, prior to the fin seal having been made. The zipper can be of either finger pressure or slider closing variety.

2. Description of the Prior Art

In the field of form fill and seal (FFS) machines, it is important that the machines operate at a high speed, while maintaining reliability in operation and a high quality product. In particular, the high speed placement of the zipper transversely across the film or web, can be a limiting factor in the operation.

U.S. Pat. No. 5,564,259 entitled "Method and Apparatus for Resealable Closure Addition to Form, Fill and Seal Bag", issued on Oct. 15, 1996 to Stolmeier discloses the securing of a zipper by adhesive or heat seal to the outside surface of film in a form fill and seal application, both longitudinally and in the transverse direction. Moreover, this reference discloses the transverse application of a zipper to the outside of a finished bag after the bag has been made on the VFFS machine. This apparatus and method of this reference do not achieve the efficiencies sought by the present invention. In U.S. Pat. No. 5,111,643 entitled "Apparatus and Fastener Supply Strip for Attaching Reclosable Fastener to Plastic Bags", issued on May 12, 1992 to Hobock, the zipper must be attached to a carrier strip. The carrier strip and zipper are drawn into the inside of he fill tube and then through a slit in the tube, to the outside of the tube where a section of the zipper is attached to the film. The zipper section is then separated from the carrier strip, which is drawn back into the tube through another slit and then out of the tube.

Representative prior art references include U.S. Pat. No. 5,557,907 entitled "Transverse Zipper System", issued on Sep. 24, 1996 to Malin et al.; U.S. Pat. No. 5,412,924 entitled "Method of Making Reclosable Plastic Bags on a Form, Fill and Seal Machine", issued on May 9, 1995 to Ausnit; U.S. Pat. No. 4,909,870 entitled "Method of and Apparatus for Attaching Continuously Running fastener Strip to Web Substrate", issued on Mar. 20, 1990 to Gould et al.; and U.S. Pat. No. 4,655,862 entitled "Method of and Means for Making Reclosable Bags and Method Therefor" issued on Apr. 7, 1987 to Christoff and Ausnit.

The sealing of a fully discontinuous zipper attached to a carrier tape is disclosed in European Patent Application Publication No. 0 528 721 A2 to Tilman, published on Aug. 9, 1991.

OBJECTS AND SUMMARY OF THE INVENTION

It is therefore an object of this invention to provide a method and apparatus for a form fill and seal machine which allows high speed operation.

It is therefore a further object of this invention to provide a method and apparatus for a form fill and seal machine which provides high reliability in operation.

It is therefore a still further object of this invention to provide a method and apparatus for a form fill and seal machine which provides high accuracy in the placement of the zipper.

It is therefore a still further object of this invention to eliminate the need for carrier tape for a transverse zipper in a form fill and seal machine.

It is therefore a still further object of this invention to avoid problems associated with bringing a pre-attached zipper around the forming collar.

It is therefore a still further object of this invention to provide flexibility in the type of zipper used, allowing, for example, use of a two webbed, four webbed or slider mounted zipper.

These and other objects are attained by providing a method and apparatus for a vertical form fill and seal (VFFS) machine wherein the unsupported zipper is applied transversely to the outside of the film or web, around the fill tub, before the reclosable bag is made. In order to practice the method, the disclosed apparatus can be attached to existing VFFS machines, provided that the diameter of the semi-circular roll and seal bar matches that of the VFFS machine filling tube. The zipper is attached to the outside of the film in the filling tube area, after the fin seal has been made and in front of the cross seal, with the filling tube acting as a backup for the sealing bar. Alternatively, the zipper is attached to the inside of the film in the filling tube area, before the fin seal has been made.

BRIEF DESCRIPTION OF THE DRAWINGS

Further objects and advantages of the invention will become apparent from the following description and claims, and from the accompanying drawings, wherein:

FIG. 1 is a perspective view of the apparatus of the present invention, forming a reclosable bag.

FIG. 2 is a plan view of the zipper used with the present invention.

FIG. 3 is a cross section of the zipper along plane 3—3 of FIG. 2.

FIG. 6 is a perspective view of an alternative embodiment of the apparatus and method of the present invention.

FIG. 7 is an upper view, partially in phantom, of the zipper transport and related structure of the alternative embodiment of the present invention.

FIG. 8 is a cross-sectional view along plane 8—8 of FIG. 7.

FIG. 8A is an alternative cross-sectional view along plane 8—8 of FIG. 7.

FIG. 9 is a cross-sectional view of the seal bar required by the alternative embodiment of the present invention.

DETAILED DESCRIPTION OF THE PREFERRED EMBODIMENT

Figure 4:
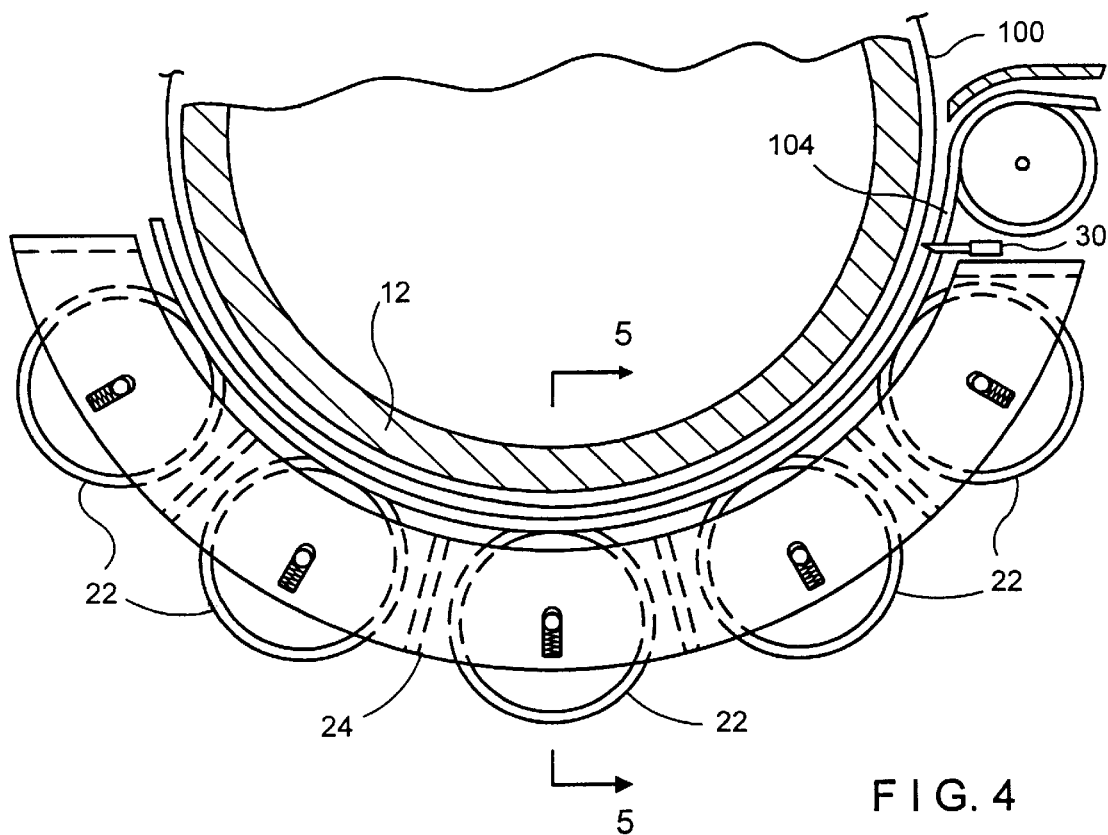
FIG. 4 is an upper view, partially in phantom, of the zipper transport and related structure of the present invention.

Referring now to the drawings in detail wherein like numerals refer to like elements throughout the several views, one sees that FIG. 1 is a perspective view of the apparatus of the present invention. A sheet of film 100 is wrapped around the fill tube 12 of vertical form fill and seal (VFFS) apparatus 10. Fin seal bar 14 seals the edges of film 100 to each other thereby forming a machine direction fin seal 102 and similarly forming a cylindrical shape of film 100 about fill tube 12.

Figures 5, 5A:
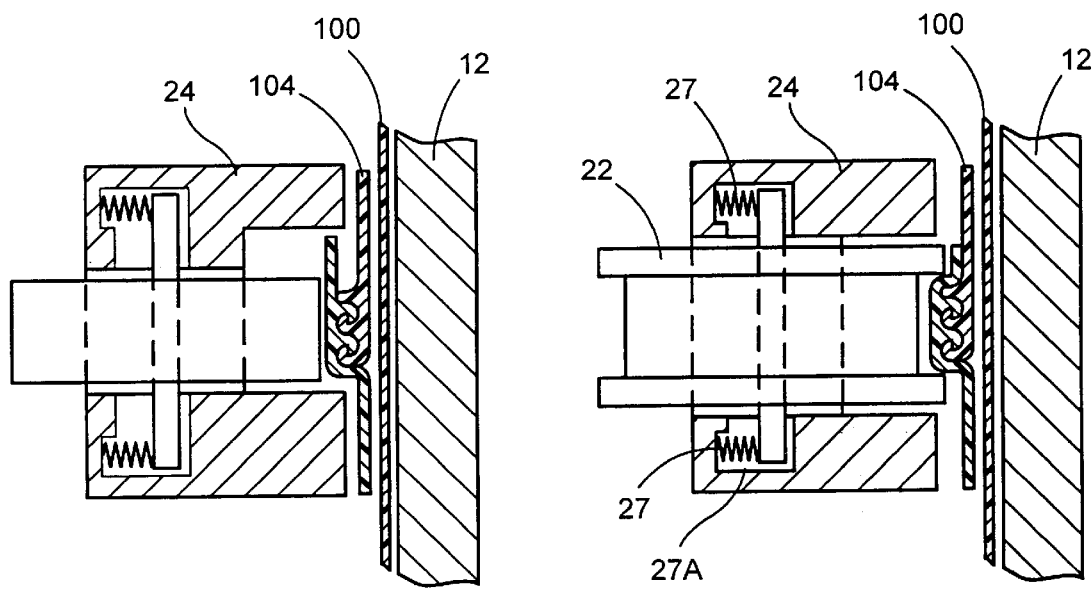
FIG. 5 is a cross-sectional view along plane 5—5 of FIG. 4.
FIG. 5A is an alternative cross-sectional view along plane 5—5 of FIG. 4.
Figure 10:
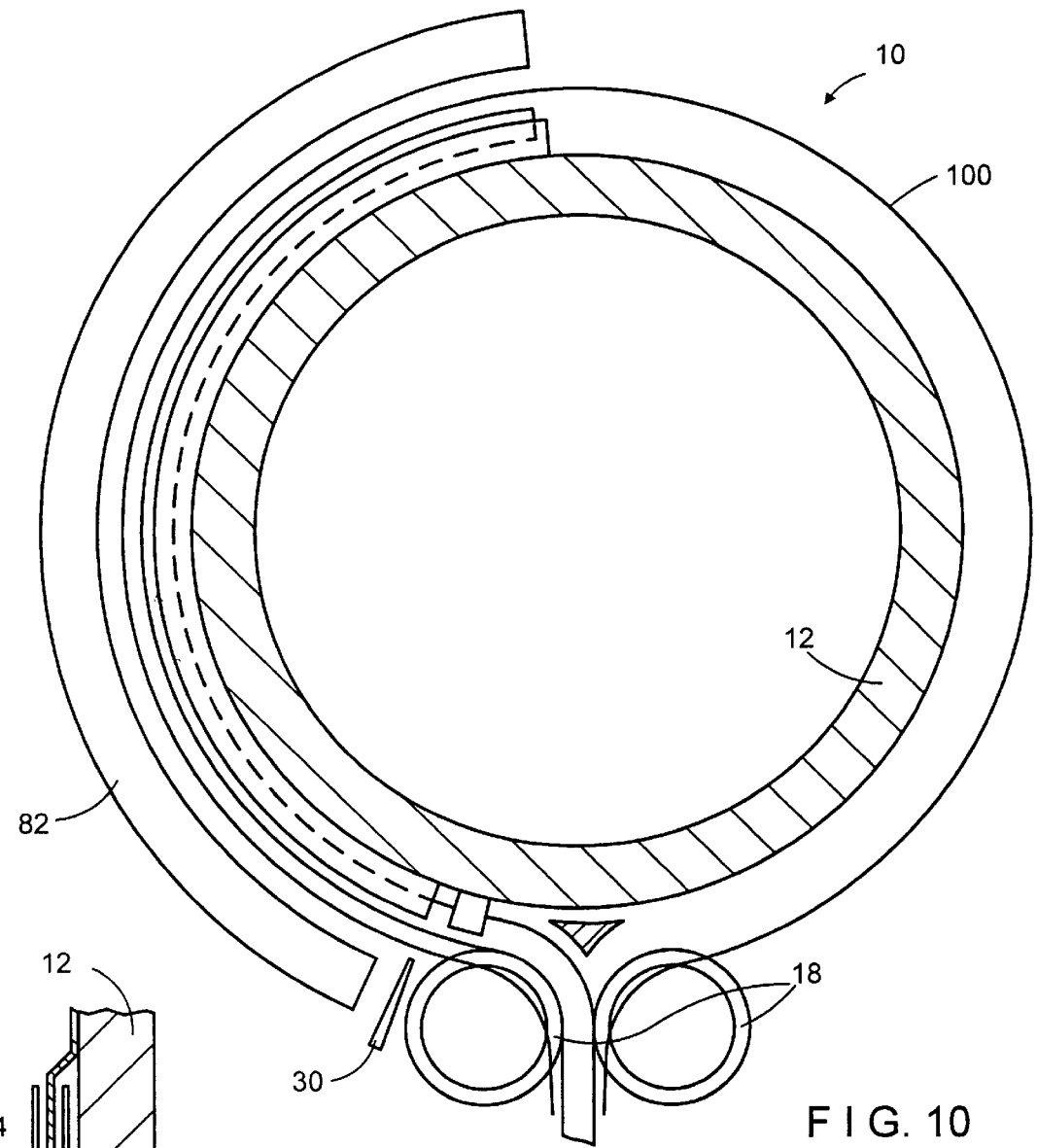
FIG. 10 is a top cross-sectional view of a further alternative embodiment of the present invention.
Figure 11:
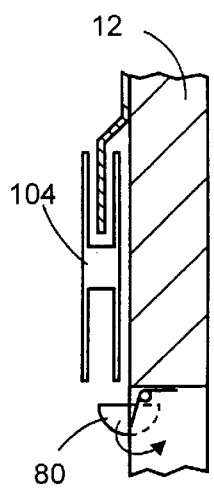
FIG. 11 is a cross-sectional view of the retractable guide ledge of the further alternative embodiment of the present invention.
Figure 12:
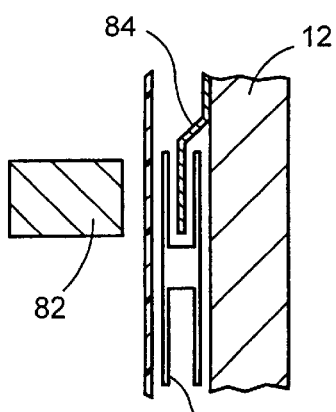
FIG. 12 is a cross-sectional view of the guide separator of the further alternative embodiment of the present invention.
Figure 13:
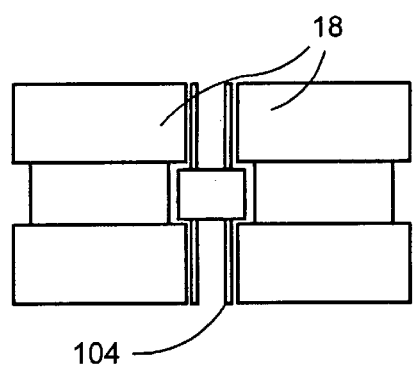
FIG. 13 is a cross-sectional view of the guide rollers and zipper of the further alterative embodiment of the present invention.

Zipper 104 is formed of interlocking profiles 106, 108 (see FIGS. 2 and 3) with opening lip 109 extending therefrom as well as webs 111 that are coated with reactivatable adhesive 111A. The zipper 104 is unsupported in that no carrier tape is used in the preferred embodiment. Zipper 104 is driven from zipper roll 16 and guided by either a guide back plate 20 and one set of grooved driven rollers 18 as shown in FIG. 1 or, alternatively, similar to that shown in FIG. 15, two opposed sets of grooved driven rollers 18. Driven rollers 22 are positioned radially outwardly from zipper 104 as zipper 104 is positioned around film 100 which, in turn, has been formed into a cylindrical shape about fill tube 12. Driven rollers 22 further extend out from the curved seal bar/roller guide 24 and are driven by motor 26. The drive rollers 22 may act against the zipper webs as shown in FIG. 5 or against the lock as shown in FIG. 5A. In either instance, the roller shafts are spring loaded and maintained against the zipper 104 by springs 27. The seal bar contains channels 27A through which the roller shafts are positioned, thereby allowing the seal bars to move back and forth without affecting the pressure the rollers maintain on the zipper webs by virtue of springs 27. Support 28 maintains the vertical position of curved seal bar/roller guide 24. Knife 30 is oriented in the machine direction and is used to cut zipper 104 to the appropriate length for the top of each bag. Cross seal bar 32 forms the seal for the bottom of each bag and separates each successive bag (see FIGS. 10 and 11).

Curved back plate 20 guides the zipper 104 against the film 100 that has been formed around the fill tube 12 after fin seal 102 has been formed. Film 100 passes behind back plate 20 with zipper 104 in front of it. Rollers 22, as supported by curved seal bar/roller guide 24, guide and position zipper 104 around fill tube 12, on the outside of film 100. Curved seal bar/roller guide 24 has a semi-circular shape and radius of curvature that match the shape of fill tube 12. During the fill cycle of the VFFS apparatus 10, curved seal bar/roller guide 24 clamps the webs of zipper 104 to film 100 and against fill tube 12 and is heated, thereby activating the adhesive and adhering the webs of zipper 104 to the film 100. Rollers 22 drive the profile section of zipper 104 into the desired position before the seal bars are activated. There is a vertical section at the ends of the seal bars that joins the two bars and acts against the spot seal, thereby sealing closed the zipper ends. Alternatively, a heated roller arrangement could be used.

Zipper 104 is illustrated in FIGS. 2 and 3. FIG. 2 illustrates that cut-out areas 110 form links 112 in spot seal areas 114 which are formed at intervals corresponding to the desired length of zipper 104 on the resulting bag. Zipper 104 is a two webbed type fastener having a web 111 on either side of the lock (engaged profiles) and an opening flange attached to one set of profiles for separating the lock, such as a configuration as shown in FIG. 3. Since the zipper for a form fill and seal application is usually made of polyethylene and would usually be attached to a barrier film, it would have to be properly prepared and the webs would have to be treater or coated with an adhesive or other attaching medium which could be heat activated. The area between the zipper length (equivalent to the bag width), spot seal areas 114, would have to be spot sealed and similarly treated. Moreover, depending upon the cutting mechanism used to separate the discrete zipper length, these area may be perforated or formed into links. If perforated, the perforations would be shaped to favor tearing in the downward or vertical direction rather than in the cross or horizontal direction. If the polyethylene film is used for producing the bag in the FFS machine, no coating steps are necessary.

There are a number of different ways to cut one zipper length from another. The zippers could be pre-cut at a station prior to the zipper being moved into position adjacent to the VFFS machine. Alternatively, the zipper could be cit at its position adjacent the VFFS apparatus 10 by either a stationary knife that acts against the zipper as the zipper film is moved downwardly during the next cycle, or by a knife that is moved up against the zipper and then down, during the sealing cycle. Links could be created in the spot seal area to facilitate the cutting action. Alternatively, if perforation favoring vertical movement is used, the downward action of the zipper film could separate the zipper lengths.

After zipper 104 has been sealed to film 100, the FFS operation continues as provided by the normal operation of the VFFS apparatus with cross seals being formed by cross seal bar 32 below the zipper seal area and the bag being filled and separated. Typically, the bags are filled in an inverted position, with the bottom pointing upwardly to receive the contents from fill tube 12 prior to cross sealing.

Because zipper 104 is on the outside of film 100, the integrity of film 100 and its contents are not affected until the bag is used by the consumer. The consumer separates zipper 104 and slits the film behind the zipper 104 for access to the contents of the bag. The slit can be as wide as desired at the option of the consumer.

An alternative embodiment of the invention is disclosed in FIGS. 6–14 wherein zipper 104 is attached to the inside of film 100. As shown in FIG. 6, zipper 104 is introduced around fill tube 12 before the formation of fin seal 102 by fin seal bar 14, at the top of fill tube 12, rather than at the bottom of fill tube 12. As shown in FIG. 6, zipper 104 is guided from zipper roll 16 to fill tube 12 by a guide back plate 20 and one set of grooved driven rollers 18. Film separating plates 21 assure that film 100 does not become snagged or entangled by the grooved driven rollers 18 and associated structure. Film guide rollers 23 assure that the edges of film 100 are accurately guided into fin seal bars 14. As shown in FIGS. 7, 8 and 8A, drive roller support 50 is internal to fill tube 12 and supports internal rollers 52 which extend through a cut out section of the fill tube 12. The rollers can drive the zipper lock as shown in FIG. 8 or the zipper webs as shown in FIG. 8A. Where the zipper lock is being driven, part of the cut out tube section is configured to provide guide rails 51. Drive rollers and support 50 are shielded by shield 54 from the product which traverses through fill tube 12. Seal bar 56 is radially adjacently outward from fill tube 12 and is urged against film 100 to seal zipper 104 to film 100.

FIG. 9 shows the cross-sectional detail of seal bar 56 which could be used to insure access to the zipper 104 without damaging it when cutting the film in front of it. Notch 58 with vacuum ports 60, 62 is provided to draw a film section or fold therewithin while a seal is provided at areas 64, 66 (onto opening lip 109) and 68. Likewise, seal bar cavity 70 is provided so that a seal is not formed directly on profiles 106, 108. A seal resistant coating 109A is provided behind the opening lip to prevent it from being sealed to the opposing zipper web. This provides that film 100 will be cut at the correct location to access zipper 104 but without cutting the webs of zipper 104.

FIGS. 10, 11, 12 and 13 illustrate another alternative embodiment of the invention regarding applying the zipper to the inside of the film. This embodiment is adapted for a zipper with flanges above and below the profile or two flanges just below the profile as in the case of a slider operated zipper. Zipper 104 is driven by grooved driven rollers 18 onto and around fill tube 12. One of the upper webs or flanges of zipper 104 enters a guide lip 84 attached to the film tube that guides zipper 104 around the tube 12 and also acts as a separator between the webs to prevent a seal through of one web onto the other. Zipper 104 is then driven the desired length around fill tube 12 by the rollers 18. If necessary, a spring loaded retractable guide ledge 80 can be positioned below the lower web to maintain zipper 104 in position. When film 110, with zipper 104, is moved, ledge 80 is pushed back into a recess by the downward force of the zipper film and snaps back after the zipper film has moved. When the right length of zipper 104 has been driven into position, semicircular bar 82 clamps and seals into position the front or outside webs (or web in the event a slider operated zipper is being used) of zipper 104 to the front bag wall of the bag that will then be formed. At the same time, knife 30 cuts off the right length of zipper section. Knife 30 goes through a slit in the guide provided for it. As the beginning of the next zipper is already in the guide, there is no expectation that zipper 104 could be out of alignment. Thereafter, the film with the front or outside zipper webs or web sealed thereto is transported down to the cross seal bar location, where the back zipper webs or web are sealed to the back wall of the bag being formed. Moreover, this further alternative embodiment could be combined with previously described apparatus for transporting the zipper 104.

Figure 14:
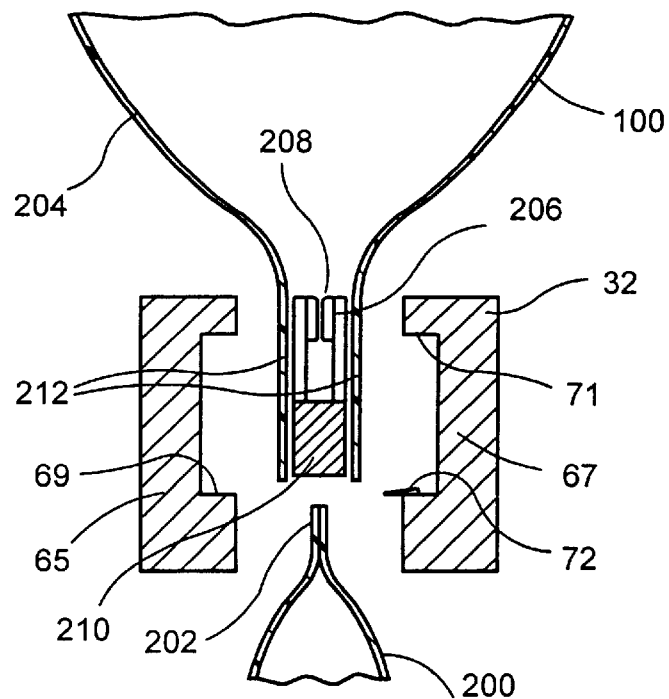
FIG. 14 is a cross-sectional view of the cross seal of the present invention.
Figure 15:
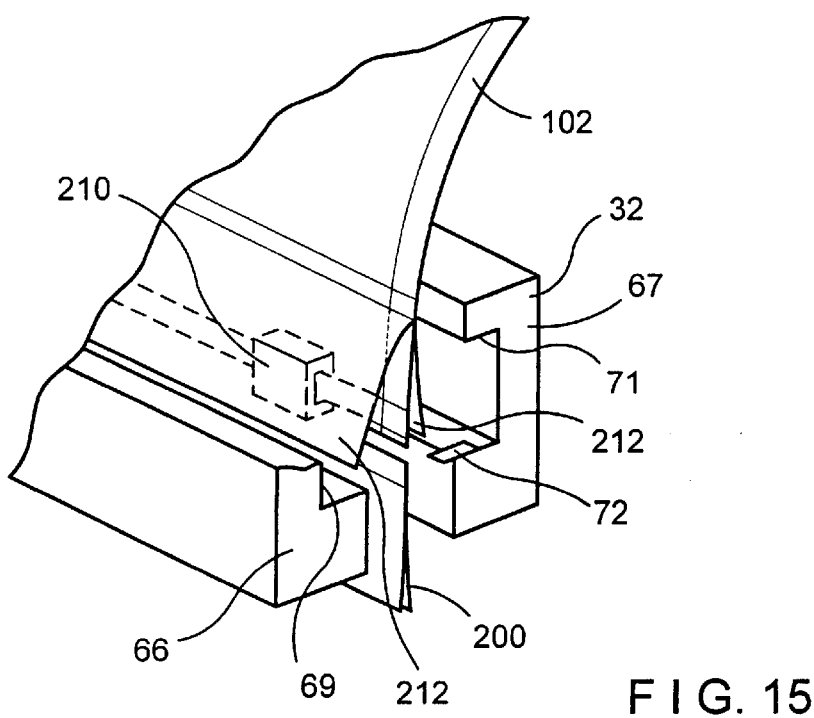
FIG. 15 is a perspective view of the cross seal of the present invention.

FIGS. 14 and 15 illustrate the sealing of the back or inside zipper web of a slider operated zipper to the film that forms the back of the bag at the cross seal bar location 32. Two opposing jaws 65, 67 with internal grooves 69, 71, respectively, form the lower seal 202 on a completed bag 200, and likewise seals the unsealed back or inside zipper web to the film and creates peel seal 208. Knife 72, which is formed on opposing jaw 66 immediately below internal groove 71, cuts completed bag 200 away from subsequent bag 204. Subsequent bag 204 includes zipper web 206 with peel seal 208 and slide 210. Due to internal grooves 69, 71, portions 212 of film 100 immediately adjacent to slide 210 are loose and not sealed.

Thus the several aforementioned objects and advantages are most effectively attained. Although a single preferred embodiment of the invention has been disclosed and described in detail herein, it should be understood that this intention is in no sense limited thereby and its scope is to be determined by that of the appended claims.

What is claimed is:

1. In a form fill and seal machine a method comprising the steps of drawing a film around a fill tube of the machine and horizontally driving and guiding a section of interlocking unsupported zipper around a portion of said film on the outside of the film formed around said tube in a direction transverse to a movement of the film and attaching said zipper section to a portion of said film.

2. The method of claim 1 further including the step of using a fin seal bar to create a fin seal prior to said steps of driving and guiding said zipper.

3. The method of claim 2 wherein said steps of driving and guiding said zipper is performed by rollers radially outwardly adjacent from said tube.

4. The method of claim 3 wherein said rollers are spring loaded.

5. The method of claim 3 wherein said rollers extend through at least a portion of a seal bar formed radially outwardly adjacent from said tube.

6. The method of claim 3 wherein said rollers further drive a zipper lock.

7. The method of claim 3 wherein said rollers further drive a zipper web.

8. The method of claim 1 wherein said zipper comprises a chain of zipper segments, said zipper segments being attached to each other by spot seals.

9. The method of claim 1 wherein said zipper comprises a chain of zipper segments, said zipper segments being attached to each other by links.

10. The method of claim 1 wherein slid zipper comprises a chain of zipper segments, said zipper segments being attached to each other by perforated sections.

11. The method of claim 1 wherein an inside surface of webs of said zipper have been coated with reactivatable heat adhesive.

12. The method of claim 1 further including the step of cutting the zipper.

13. The method of claim 1 wherein said zipper includes a slider.

14. A method of attaching a section of unsupported interlocking zipper transversely to a portion of film drawn around a fill tube of a form fill and seal machine including the steps of driving and guiding said zipper horizontally around the inside of the film formed around the tube in a direction transverse to a direction of movement of the film.

15. The method of claim 14 further including the step of using a fin seal bar to create a fin seal subsequent to said steps of driving and guiding said zipper.

16. The method of claim 15 wherein said steps of driving and guiding said zipper is performed by rollers at least partially within said tube.

17. The method of claim 16 wherein said rollers extend through at least a portion of said tube.

18. The method of claim 16 wherein said rollers drive a zipper lock.

19. The method of claim 16 wherein said rollers drive a zipper web.

20. The method of claim 16 further including the step of providing plates to guide the film around the zipper at an area wherein said zipper is inserted inside said film.

21. The method of claim 16 further including the step of providing non-sealant material to an opening lip of said zipper.

22. The method of claim 16 further including the step of pulling a relatively small section of film from the zipper thereby creating a pocket prior to sealing said film to said zipper.

23. The method of claim 16 wherein said zipper includes four webs, and further including the steps of attaching front webs at a seal fill tube location to an area that will become a front of a resulting bag and attaching back webs to a back panel of the bag at a cross seal bar location.

24. The method of claim 16 wherein said zipper includes two webs and a mounted slider.

25. The method of claim 15 wherein a retractable ledge is formed on said tube and rollers urge the zipper along said retractable ledge.

* * * * *